(12) United States Patent
Chamberlin

(10) Patent No.: US 8,362,666 B2
(45) Date of Patent: Jan. 29, 2013

(54) PHASE LEAD CONNECTION FOR PARALLEL PATH ELECTRIC MACHINE

(75) Inventor: Bradley D. Chamberlin, Pendleton, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 350 days.

(21) Appl. No.: 12/851,306

(22) Filed: Aug. 5, 2010

(65) Prior Publication Data
US 2012/0032540 A1 Feb. 9, 2012

(51) Int. Cl.
*H02K 11/00* (2006.01)

(52) U.S. Cl. .......................................... 310/71; 310/179

(58) Field of Classification Search .................... 310/71, 310/179, 201, 208
See application file for complete search history.

(56) References Cited

U.S. PATENT DOCUMENTS

| | | | |
|---|---|---|---|
| 6,710,501 B1 * | 3/2004 | Kusumoto et al. | 310/254.1 |
| 6,791,228 B2 * | 9/2004 | Hashiba et al. | 310/201 |
| 2002/0011753 A1 | 1/2002 | Asao et al. | |
| 2003/0214190 A1 * | 11/2003 | Congdon et al. | 310/71 |
| 2003/0218394 A1 * | 11/2003 | Hashiba et al. | 310/71 |
| 2004/0119362 A1 | 6/2004 | Neet | |
| 2004/0232780 A1 | 11/2004 | Oohashi | |
| 2005/0253466 A1 * | 11/2005 | Seguchi et al. | 310/71 |
| 2005/0275296 A1 * | 12/2005 | Kumakura et al. | 310/71 |
| 2008/0191574 A1 | 8/2008 | Tokizawa | |
| 2010/0109456 A1 * | 5/2010 | Sugiyama et al. | 310/71 |
| 2010/0201212 A1 * | 8/2010 | Urano et al. | 310/71 |
| 2011/0001373 A1 * | 1/2011 | Mori et al. | 310/71 |

OTHER PUBLICATIONS

International Search Report and Written Opinion for corresponding PCT Application No. PCT/US2011/045284, dated Feb. 17, 2012, pp. 1-9.

* cited by examiner

*Primary Examiner* — Thanh Lam
(74) *Attorney, Agent, or Firm* — Cantor Colburn LLP

(57) ABSTRACT

A stator for an electric machine includes a stator winding located at a stator core. The stator winding has one or more phases, each phase including a single unitary conductor having at least two conductor segments arranged in an electrically parallel relationship. A connection portion is formed in the single unitary conductor between a first conductor segment and a second conductor segment of the at least two conductor segments to connect the conductor to an electrical component.

14 Claims, 3 Drawing Sheets

PHASE LEAD CONNECTION FOR PARALLEL PATH ELECTRIC MACHINE

BACKGROUND OF THE INVENTION

The subject matter disclosed herein generally relates to electric machines. More specifically, the subject disclosure relates to phase lead connections for parallel path electric machines.

A stator of a typical electric machine includes a stator winding which is wound in series or wound with a defined number of parallel paths, and may also include more than one phase. The wiring harness which connects the electric machine to, for example, an inverter, typically provides one connector per phase, regardless of the number of parallel paths in the machine. Typically an eyelet is formed in each end of each phase lead to connect to the wiring harness. For example, in a machine with three phases (A, B, C) and two parallel paths (1,2), six eyelets (A1, A2, B1, B2, C1, C2) are formed. The eyelets include mating surfaces so that the eyelets for each phase may be placed in contact with each other at the mating surfaces, then secured together (A1 to A2, B1 to B2, C1 to C2). Each of the three pairs of eyelets is then connected to the wiring harness. This type of connection, however, has several concerns associated with it. First, the connection between the mating surfaces may be highly resistive due to oxidation on the mating surfaces. Second, improper forming and/or handling of the eyelets and the mating surfaces results in a low amount of surface area of contact between the two mating surfaces. This results in a failure of current transfer through the eyelets and overheating and failure of the phase leads. Third, the eyelets must be secured together and withstand vibration and other loads in the operating environment. If the connection between eyelets loosens or breaks, excessive heat is generated in the joint again resulting in failure of the phase leads.

The art would well receive an improved connection scheme through which operational efficiency of the electric machine can be improved.

SUMMARY

Disclosed is a stator for an electric machine including a stator winding located at a stator core. The stator winding has one or more phases, each phase including a single unitary conductor having at least two conductor segments arranged in an electrically parallel relationship. A connection portion is formed in the single unitary conductor between a first conductor segment and a second conductor segment of the at least two conductor segments to connect the conductor to an electrical component.

Also disclosed is an electric machine including a rotor located at a central axis and a stator located at the rotor. The stator includes a stator core and a stator winding disposed at the stator core. The stator winding includes one or more phases, each phase including a single unitary conductor having at least two conductor segments arranged in an electrically parallel relationship. A connection portion is formed in the single unitary conductor between a first conductor segment and a second conductor segment of the at least two conductor segments to connect the conductor to an electrical component.

BRIEF DESCRIPTION OF THE DRAWINGS

Referring now to the drawings wherein like elements are numbered alike in the several Figures.

DETAILED DESCRIPTION

Figure 1:
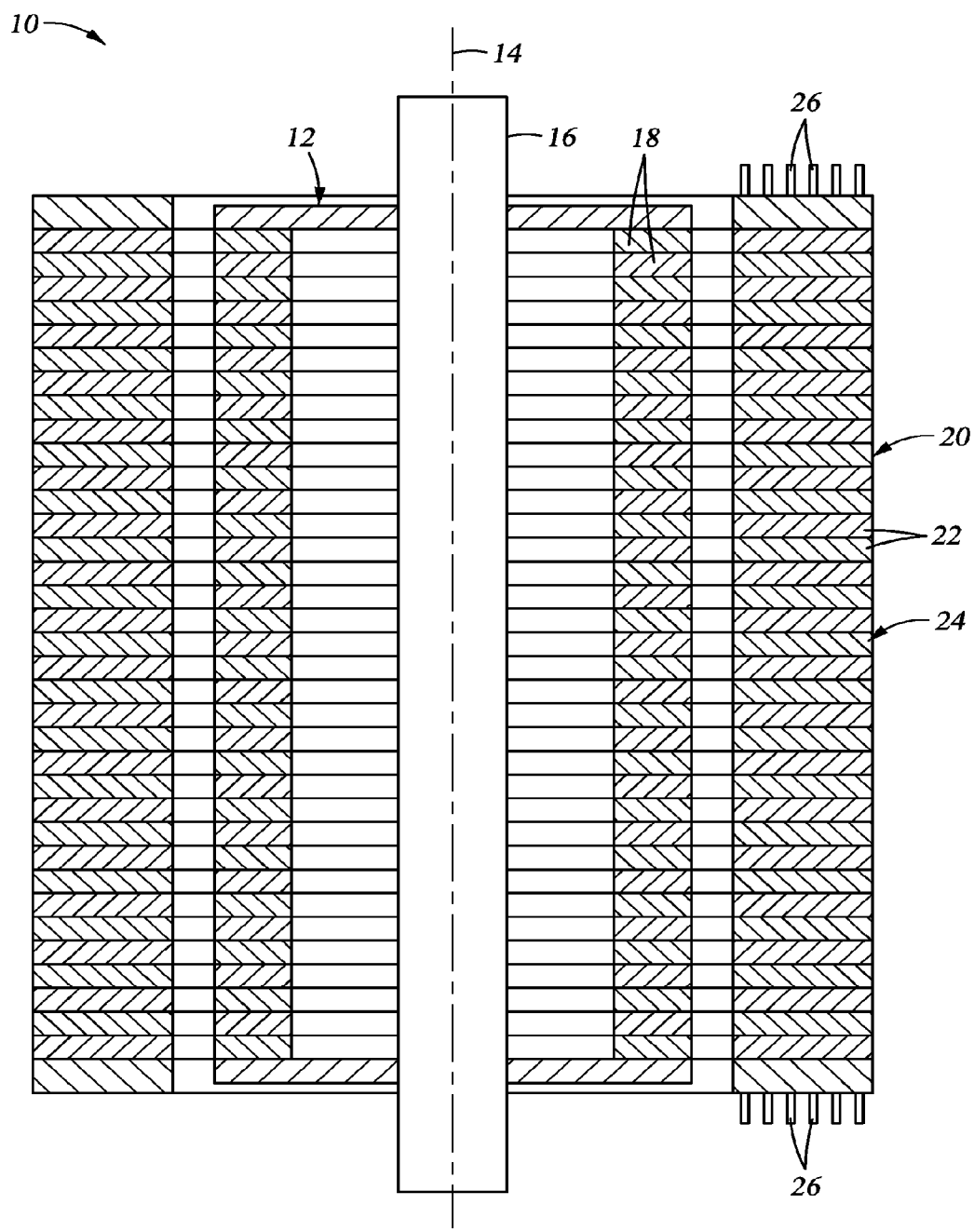
FIG. 1 is a cross-sectional view of an embodiment of an electric machine.

Shown in FIG. 1 is a cross-sectional view of an embodiment of an electric machine 10, for example, an alternator or generator. The electric machine 10 includes a rotor 12 rotably located at a central axis 14 of the electric machine 10. The rotor 12 comprises a rotor shaft 16 and, in some embodiments, a plurality of rotor laminations 18 affixed to an outboard surface of the rotor shaft 16. A stator 20 is disposed radially outboard of the rotor 12. The stator 20 extends axially along a length of the rotor 12 and substantially circumferentially surrounds the rotor 12. The stator 20 includes a plurality of stator laminations 22 which in some embodiments are arranged substantially axially to form a stator core 24. A plurality of conductors 26 extend through the stator core 24 to form a stator winding.

Figure 2:
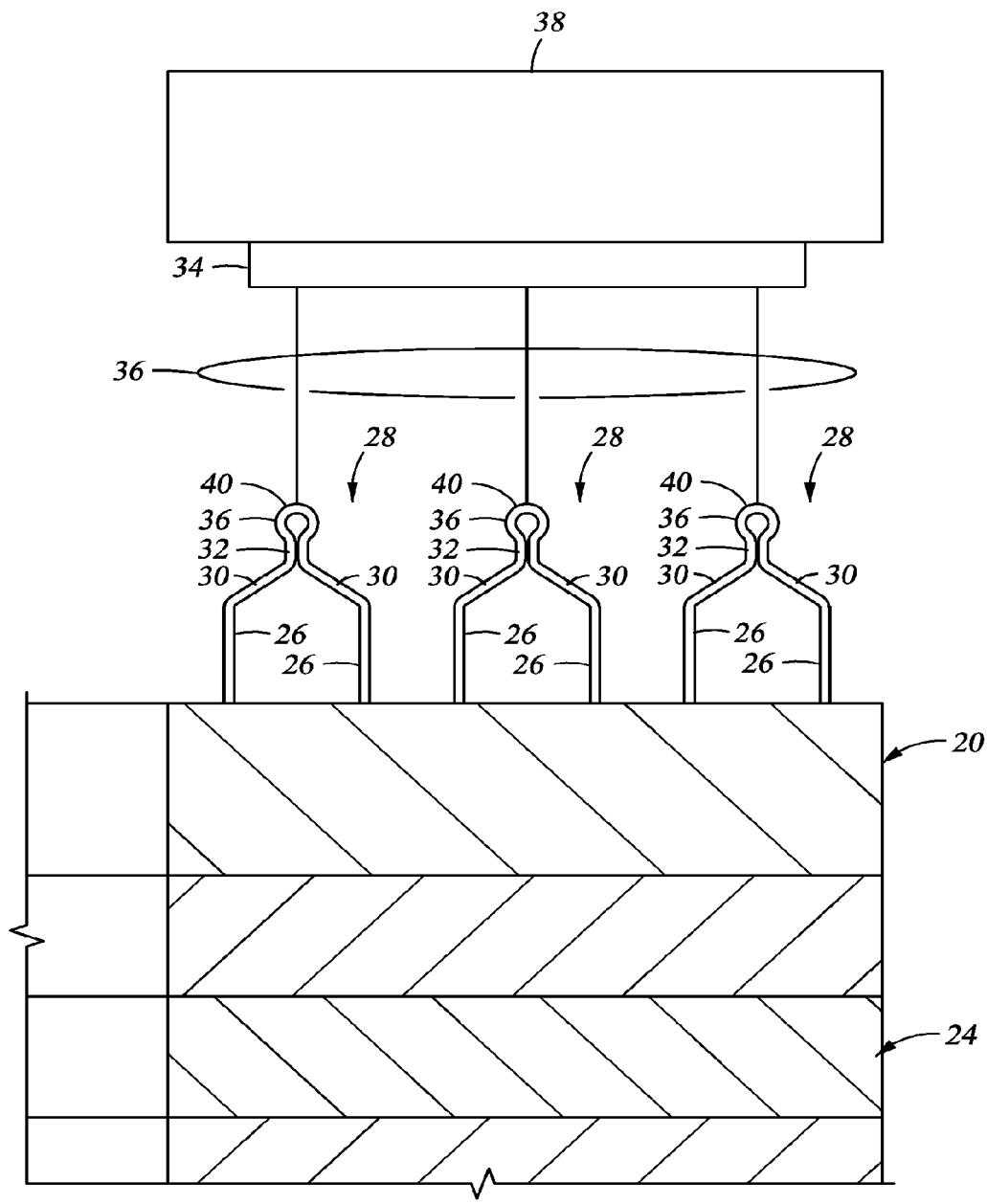
FIG. 2 is schematic view of stator conductors of an embodiment of an electric machine.

Referring to FIG. 2, the electric machine 10 is a "parallel path" electric machine, in that the stator winding includes at least two conductor segments 30 of the conductor 26 arranged in an electrically parallel relationship, or a parallel path, for each phase of the winding. In the embodiment shown in FIG. 2, the stator winding comprises three phases 28, with each phase 28 having two conductor segments 30 arranged electrically in parallel so that each phase 28 has one parallel path defined by the two conductor segments 30. In some embodiments, the conductor segments 30 are portions of the same conductor 26, with the parallel path formed by reversing the conductor 26 back toward the stator core 24 when the conductor 26 exits the stator core 24.

Figure 3:
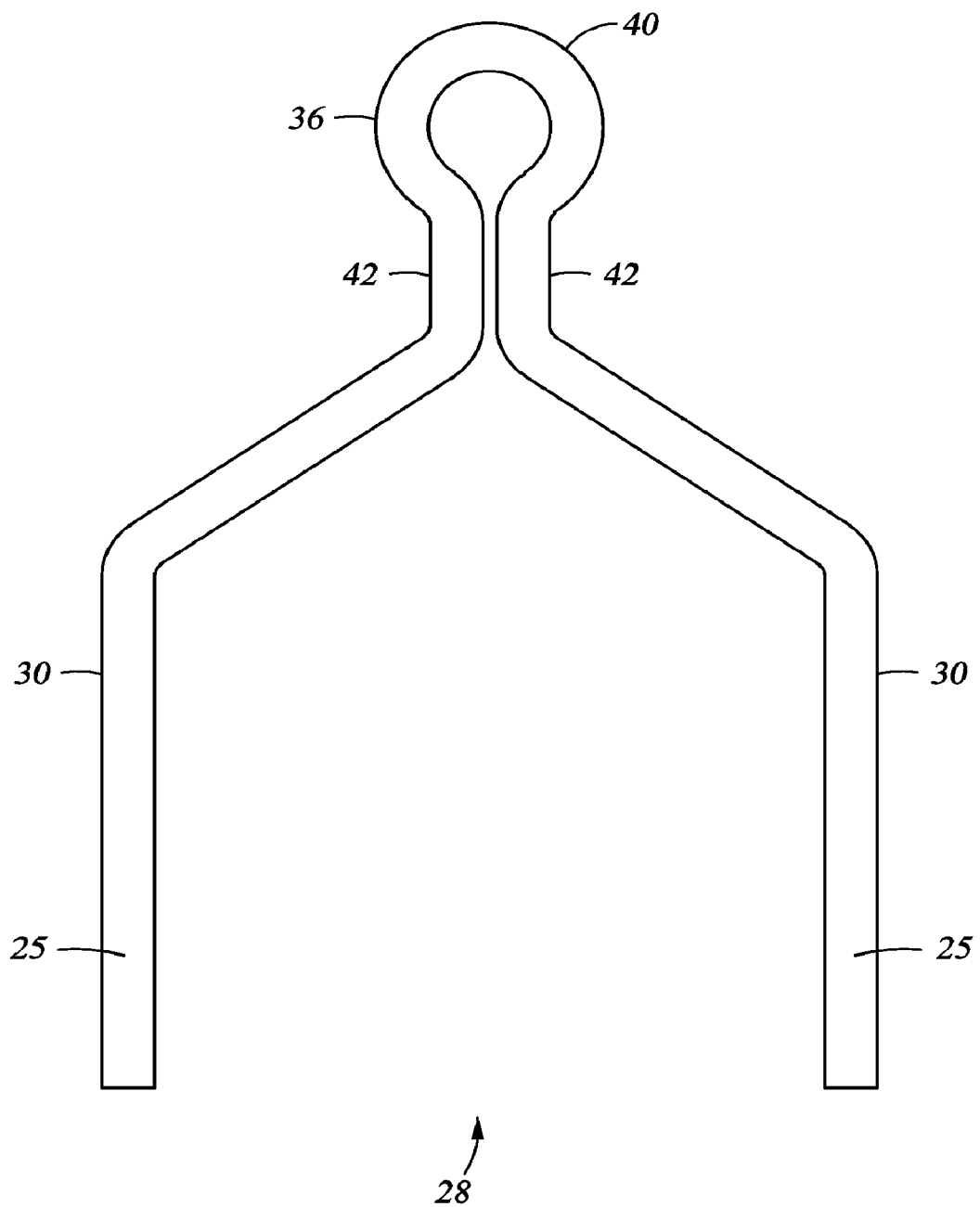
FIG. 3 is a perspective view of an embodiment of an eyelet for stator conductors.

Ends 32 of the conductor segments 30 exit the stator core 24 and are connected to a wiring harness 34 via a connection portion 36. The wiring harness 34 is, in turn, connected to an external component such as an inverter 38 or a converter. Referring now to FIG. 3, in some embodiments, the connection portion 36 is loop-shaped or partially loop-shaped. In some embodiments, the connection portion 36 includes a loop or partial loop 40 and phase legs 42 extending from each end of the partial loop 40 to the conductor segments 30. As Shown in FIG. 3, the connection portion 36 may be formed integral to the conductor segments 30, or in alternate embodiments may be formed separately and secured to each of the conductor segments 30 by, for example, a brazing or welding process.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A stator for an electric machine comprising:
   a stator winding disposed at a stator core, the stator winding having one or more phases, each phase including a single unitary conductor having at least two conductor segments arranged in an electrically parallel relationship; and
   a connection portion formed in the single unitary conductor between a first conductor segment and a second conductor segment of the at least two conductor segments to connect the conductor to an electrical component.

2. The stator of claim 1, wherein the stator winding comprises three phases.

3. The stator of claim 1, wherein each phase includes two electrically parallel conductor segments.

4. The stator of claim 1, wherein the connection portion is formed integral to the conductor.

5. The stator of claim 1, wherein the connection portion is formed separately from the conductor and secured thereto.

6. The stator of claim 1, wherein the connection portion is a loop or partial-loop shape.

7. The stator of claim 1, wherein the joint is operably connectible to an inverter or a converter.

8. An electric machine comprising:
   a rotor disposed at a central axis; and
   a stator disposed at the rotor including:
      a stator core; and
      a stator winding disposed at the stator core, the stator winding having one or more phases, each phase including a single unitary conductor having at least two conductor segments arranged in an electrically parallel relationship; and
      a connection portion formed in the single unitary conductor between a first conductor segment and a second conductor segment of the at least two conductor segments to connect the conductor to an electrical component.

9. The electric machine of claim 8, wherein the stator winding comprises three phases.

10. The electric machine of claim 8, wherein each phase includes two electrically parallel conductor segments.

11. The electric machine of claim 8, wherein the connection portion is formed integral to the conductor.

12. The electric machine of claim 8, wherein the connection portion is formed separately from the conductor and secured thereto.

13. The electric machine of claim 8, wherein the connection portion is a loop or partial-loop shape.

14. The electric machine of claim 8, wherein the connection portion is operably connectible to an inverter or converter.

* * * * *